United States Patent
Enomoto

[11] 3,792,763
[45] Feb. 19, 1974

[54] TIMING VALVE FOR AN AUTOMATIC POWER TRANSMISSION

[75] Inventor: Koji Enomoto, Yokohama, Japan

[73] Assignee: Nissan Motor Company, Limited, Yokohama City, Japan

[22] Filed: Oct. 27, 1971

[21] Appl. No.: 193,015

[30] Foreign Application Priority Data
Oct. 29, 1970  Japan.............................. 45-107901

[52] U.S. Cl. .............. 192/.075, 91/412, 192/109 F, 74/869, 137/506
[51] Int. Cl. ...................... B60k 21/00, F16d 25/10
[58] Field of Search .. 192/109 F, .075, .076; 74/869

[56] References Cited
UNITED STATES PATENTS

| | | | |
|---|---|---|---|
| 3,014,383 | 12/1961 | Flinn................................. | 74/869 X |
| 3,212,357 | 10/1965 | Knowles et al. .................. | 74/869 X |
| 3,274,848 | 9/1966 | Konrad et al...................... | 74/869 X |
| 3,371,759 | 3/1968 | Sapolsky.......................... | 192/109 F |

*Primary Examiner*—Benjamin W. Wyche

[57] ABSTRACT

A timing valve for controlling a fluid pressure operated servo motor, which timing valve includes a valve body having therein a valve chamber with inlet port, an outlet port and throttle pressure port, a first passageway communicating with the inlet port and connected to a source of fluid pressure, a second passageway communicating with the outlet port and connected to the fluid pressure operated servo motor, an orifice formed in the valve body between the first and second passageways to allow the fluid pressure in the inlet port to pass to the second passageway at the restricted flow rate, a valve spool slidably disposed in the valve chamber for controlling communication between the inlet and outlet ports, and a spring for urging the valve spool thereby to interrupt communication between the inlet and outlet ports. The one end portion of the valve spool is exposed to the throttle pressure in the throttle pressure port and biased in one direction by the force developed thereby against the force of the spring to establish communication between the inlet and outlet ports when the throttle pressure reaches a predetermined level.

1 Claim, 2 Drawing Figures

INVENTOR
KOJI ENOMOTO
BY John Lezolly
ATTORNEY

TIMING VALVE FOR AN AUTOMATIC POWER TRANSMISSION

This invention relates to an automotive automatic power transmission and more particularly, to a timing valve for the power transmission.

As is well known in the art, an automatic power transmission usually includes a hydraulic control system having shift valves for controlling a plurality of friction elements, such as friction clutches and brakes, to selectively provide a desired gear ratio. To effect smooth shifting between the gear ratios, a line pressure used in the hydraulic control system is regulated to an appropriate level in accordance with the variations in engine load and vehicle speed. The line pressure thus regulated is supplied to a plurality of fluid pressure operated servo motors of the power transmission for actuating the friction elements under the control of the shift valves. When upshifting takes place from one gear ratio to another, the friction elements are normally kept in their engaged condition. During light engine load, the friction elements are initially maintained in their disengaged condition, that is, in a neutral condition for a fixed time interval. This fixed time interval is called a neutral interval, which must be arranged to be longer for a higher vehicle speed and a lower engine load. If the neutral interval is shorter than an appropriate value during light engine load, a great shock is experienced during shifting operation. If the neutral interval is longer than the appropriate value during heavy engine load, an excessive engine racing will take place resulting in unusual mechanical shocks in various parts of the power transmission when shifting.

To reduce shifting shocks, it has been conventionally proposed to have the line pressure varied in accordance with the variations in engine throttle setting that approximately corresponds to engine torque while keeping the neutral interval at a certain constant value irrespective of engine load throughout the whole operating conditions of the power transmission. Such prior practice is however, insufficient for achieving smooth shifting between the different gear ratios.

It is, therefore, an object of this invention to provide a timing valve which is highly effective to reduce shifting shocks in an automotive automatic power transmission for thereby effecting smooth shifting between gear ratios.

Another object of this invention is to provide a timing valve which is adapted to provide an appropriate neutral interval in accordance with one of varying operational conditions of a motor vehicle.

Still another object of this invention is to provide a timing valve which is simplified in construction and reliable in operation.

In order to achieve these and other objects and advantages, the present invention contemplates to provide a timing valve for use in an automotive automatic power transmission which timing valve is arranged to produce an appropriate neutral interval during light engine load, that is, when an accelerator pedal is kept released while the neutral interval is prevented from being produced during heavy engine load, that is, when the accelerator pedal is kept depressed. To this end, the timing valve is incorporated therein a valve body having a valve chamber, in which a valve spool is slidably disposed. The valve chamber has formed therein an inlet port communicating with a source of fluid pressure, an outlet port communicating with a fluid pressure operated servo motor. An orifice is provided in the valve body between the inlet and outlet ports for allowing the fluid pressure delivered to the inlet port to pass into the outlet port at the restricted flow rate even when the inlet port is blocked from communication with the outlet port by the valve spool. The valve spool is made responsive to the variations in engine torque so as to provide the appropriate netural interval. More particularly, the valve spool is arranged to move in a position to produce the neutral interval when an engine throttle setting is below a predetermined value and to move in another position to prevent the neutral interval from being produced when the engine throttle setting is above the predetermined value.

The timing valve of the present invention will be herein shown and described as having two line systems through which the controlled line pressure is supplied to respective desired devices, such as fluid pressure operated servo motors of friction elements. However, it should be appreciated that one or more than two line systems may be formed in the timing valve by varying the number of spaced lands of the valve spool.

Figure 1:
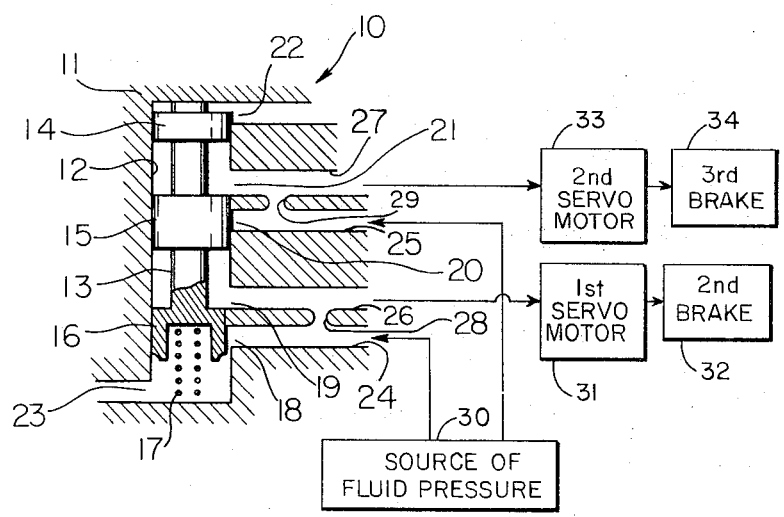
FIG. 1 is a sectional view of a timing valve according to this invention.

Referring now to FIG. 1, there is schematically shown a timing valve implementing this invention, which is generally indicated by numeral 10. The timing valve 10 includes a valve body 11 having formed therein a valve chamber 12, in which a valve spool 13 is slidably disposed. The valve spool 13 is formed thereon a plurality of spaced lands 14, 15 and 16 and biased upwardly by the force of a spring 17, as viewed in FIG. 1.

The valve chamber 12 has a plurality of ports 18, 19, 20, 21, 22 and 23. The ports 18 and 20 are inlet ports which communicate with passageways 24 and 25, respectively. These passageway are supplied with a line pressure from a source of fluid pressure 30 under the control of shift valves (not shown). The passage-ways 24 and 26 are formed in the valve body 11 so as to extend in parallel to each other, and the passageways 25 and 27 are formed in the valve body 11 so as to extend in parallel to each other. The ports 19 and 21 are outlet ports which communicate with passageways 26 and 27, respectively. The passageway 26 is connected to a first fluid pressure operated servo motor 31 for actuating a friction element such as, for example, a second brake 32 to provide a second speed gear ratio when engaged. The passageway 27 is connected to another fluid pressure operated servo motor 33 for actuating friction element such as, for example, a third brake 34 to provide a third speed gear ratio when engaged.

The port 22 is a throttle pressure port, to which a hydraulic throttle pressure is supplied. The throttle pressure is functionally related to engine throttle setting which corresponds to engine torque. This throttle pressure is utilized as a signal pressure for controlling the movement of the valve spool 13 so that smooth engagements of the friction elements are obtained, in a manner which will be discussed hereinafter in detail. The port 23 is a drain port from which an excess of fluid is drained off.

As seen in FIG. 1, an upper end portion of the valve spool 13 is exposed to the pressure in the throttle pressure port 22 and biased downwardly by the force developed by the throttle pressure against the force of the spring 17. The valve spool 13 is thus responsive to the throttle pressure in the port 22 for thereby varying communications between ports 18 and 19 and between ports 20 and 21 by the action of the lands 15 and 16, respectively.

To delay operation of the servo motor, orifices 28 and 29 are formed in the valve body 11 so as to extend between the parallely extending passageways 24 and 26 and between the parallely extending passageways 25 and 27. Each of these orifices permits the line pressure delivered from the source of the fluid pressure to pass into the passageway communicating with the fluid pressure operated servo motor at a restricted flow rate. This causes the fluid pressure operated servo motor to operate at a delayed time period for thereby effecting smooth engagement of the friction element. It should be appreciated that the duration of the delay in the operation of the fluid pressure operated servo motor may be varied by appropriately calibrating the orifice.

When the throttle pressure in the throttle pressure port 22 is below a predetermined level, that is, during light engine load., the valve spool 13 is biased upwardly of the drawing because the force of the spring 17 overcomes the force developed by the throttle pressure in the throttle pressure port 22., so that the inlet ports 18 and 20 for the line pressure are blocked by the spaced lands 15 and 16. If, in this condition, the line pressure is supplied to the inlet port 20 through the passageway 25, then the line pressure is passed through the restriction 29 to the passageway 27. The line pressure delivered to the passageway is transmitted to the fluid pressure operated servo motor and, accordingly, the associated friction element will be engaged. Since, in this instance, the flow rate of the line pressure is restricted by the action of the restriction 29, so that an appropriate neutral interval is produced before full engagement of the friction element is delayed. However, if the throttle pressure in the throttle pressure port 22 reaches the predetermined level, that is, during heavy engine load then the valve spool 13 is moved downwardly of the drawing because the force developed by the throttle pressure overcome the force of the spring 17. Consequently, the outlet port 21 is brought into communication with the inlet port 20 while the inlet port 18 communicates with the outlet port 19. If, in this condition, the line pressure is supplied to the inlet port 20, the line pressure is delivered to the outlet port 21. The line pressure delivered to the outlet port 21 is passed through the passageway 27 to the fluid pressure operated servo motor thereby actuating the associated friction element. Since, in this condition, the flow rate of the line pressure is not restricted, the neutral interval is prevented from being produced during heavy engine load and there will be no delay in operation of the fluid pressure operated servo motor. Thus, an excessive engine racing can be avoided during heavy engine load. It may be understood that, since the operation of the line system consisting of passageways 24 and 26 is the same with that of the line system consisting of the passageways 25 and 27, the detailed description of the same is herein omitted for the sake of simplicity of illustration.

Figure 2:
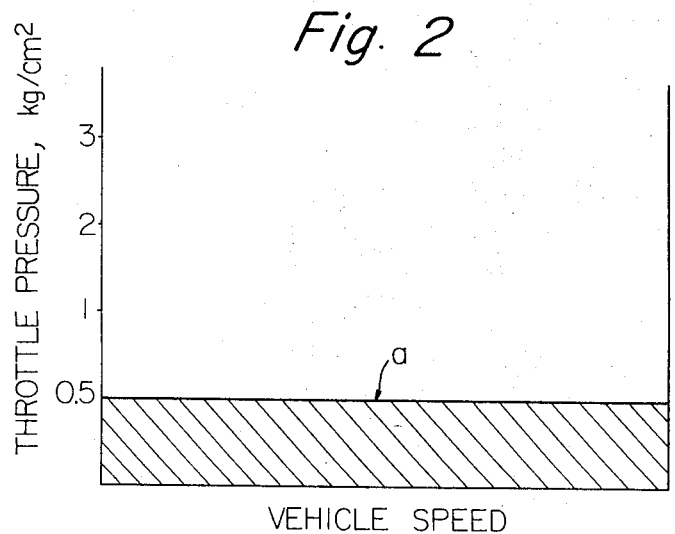
FIG. 2 is a view illustrating an operating characteristic of the timing valve shown in FIG. 1.

An example of the operating characteristic of the timing valve according to the present invention is illustrated in FIG. 2, wherein throttle pressure is plotted against vehicle speed. As seen from FIG. 2, the flow rate of the line pressure is restricted by the orifice when the throttle pressure is below the predetermined level as shown by the solid line $a$. This causes the time duration of operation of the fluid pressure operated servo motor to vary in accordance with the variations in engine load irrespective of vehicle speed. Accordingly, the shifting shocks that would otherwise occur during light engine load and the excessive engine racing that would otherwise occur during heavy engine load will be significantly reduced thereby increasing reliability in performance of the power transmission.

It should be appreciated that although the valve spool of the timing valve of the present invention has been shown and described as being controlled by the throttle pressure, the valve spool may be actuated by providing a direct mechanical linkage with an accelerator pedal, if desired.

What is claimed is:

1. A timing valve for an automotive automatic power transmission having at least two fluid pressure operated servo motors to actuate friction elements, and a source of fluid pressure, comprising a valve body having formed therein a valve chamber, said valve chamber having at least two inlet ports, at least two outlet ports and a throttle pressure port, a first passageway formed in said valve body, said first passageway communicating with one of said inlet ports and connected to said source of fluid pressure, a second passageway formed in said valve body and extending in parallel to said first passageway, said second passageway communicating with one of said outlet ports and connected to one of said fluid pressure operated servo motors, a third passageway formed in said valve body, said third passageway communicating with another of said inlet ports and connected to said source of fluid pressure, a fourth passageway formed in said valve body, said fourth passageway communicating with another of said outlet ports and connected to another of said fluid pressure operated servo motors, a first restriction formed in said valve body and extending between said first and second passageways, a second restriction formed in said valve body and extending between said third and fourth passageways, a valve spool slidably disposed in said valve chamber and having spaced valve lands to control fluid communication between said inlet and outlet ports, one end portion of said valve spool being exposed to a throttle pressure in said throttle pressure port and biased in one direction by the force developed thereby, and a spring means disposed in said valve chamber and biasing said valve spool in another direction, said valve spool being moved toward a position to interrupt fluid communication between said inlet and outlet ports by the force of said spring means so as to admit a fluid pressure in said first and second passageways to said third and fourth passageways through said first and second restrictions respectively at predetermined restricted flow rates and thereby produce neutral intervals before full engagement of said friction elements when said throttle pressure in said throttle pressure port is below a predetermined level and, when said throttle pressure in said throttle pressure port is above the predetermined level, said valve spool being moved toward a position to establish fluid communication between said inlet and outlet ports against the force of said spring means thereby terminating said neutral intervals.

* * * * *